No. 840,181. PATENTED JAN. 1, 1907.
H. M. WINCHESTER.
RECEPTACLE FOR GATHERING TURPENTINE.
APPLICATION FILED MAY 19, 1905.
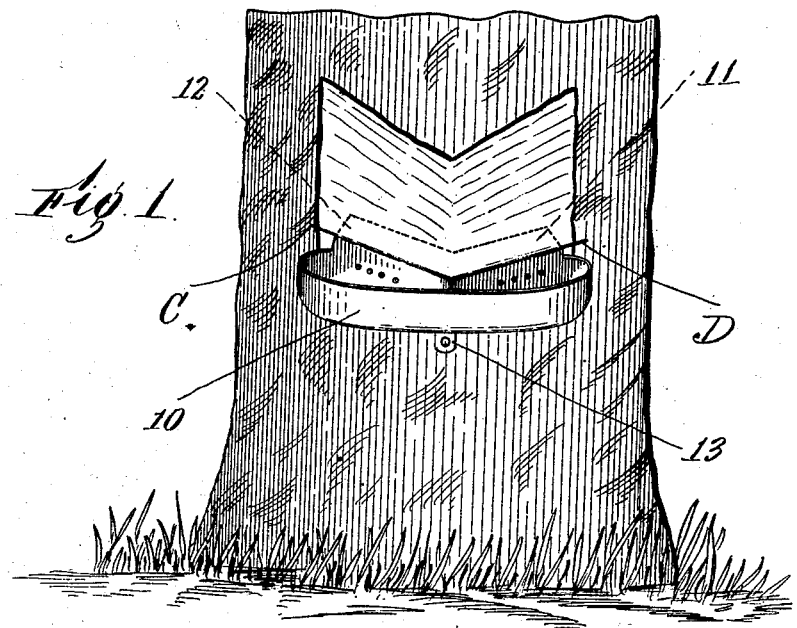
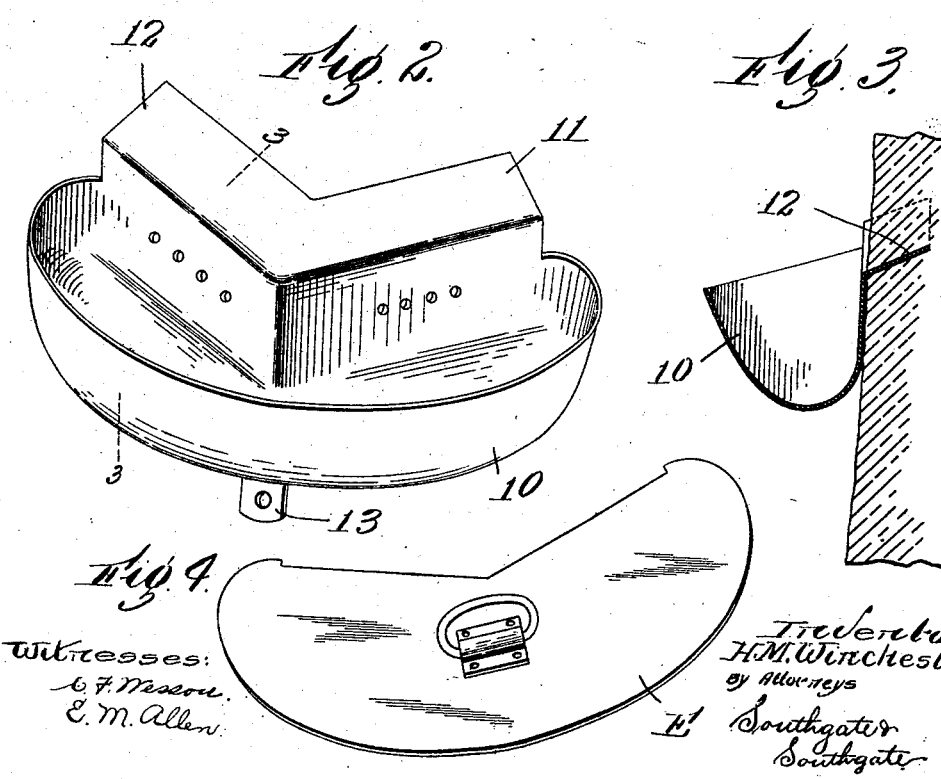

UNITED STATES PATENT OFFICE.

HARRY M. WINCHESTER, OF WORCESTER, MASSACHUSETTS.

RECEPTACLE FOR GATHERING TURPENTINE.

No. 840,181.　　　　　Specification of Letters Patent.　　　　Patented Jan. 1, 1907.

Application filed May 19, 1905. Serial No. 261,204.

*To all whom it may concern:*

Be it known that I, HARRY M. WINCHESTER, a citizen of the United States, residing at Worcester, in the county of Worcester and State of Massachusetts, have invented a new and useful Receptacle for Gathering Turpentine, of which the following is a specification.

This invention relates to a receptacle which has been specially designed for use in gathering turpentine and resin-oils.

The especial objects of this invention are to provide a light, strong, and inexpensive sap-cup for use in connection with the turpentine interest and which is provided with simple and efficient means for fastening the same in place in such a way that it will not require skilled labor, will not injure the tree to which it is applied, and may be used in connection with trees of different diameters, which can be conveniently raised and applied higher up on its tree from time to time as the "chipping" operation is carried high up on the tree, and which may be provided with a cover protecting the contents of the receptacle during "scraping and chipping" operations.

To these ends this invention consists of an improved sap-cup as an article of manufacture and of the combination of parts therewith, as hereinafter described and more particularly pointed out in the claims at the end of this specification.

In the accompanying drawings, Figure 1 is a fragmentary view of sufficient part of a tree-trunk to illustrate the application of this invention thereto. Fig. 2 is an enlarged perspective view of a sap-cup construction according to this invention. Fig. 3 is a sectional view thereof, taken on line 3 3 of Fig. 2;
and Fig. 4 is a perspective view of a cover for the sap-cup.

In gathering turpentine in the pine forests of the Southern States it is customary to chop into the base of each tree a cup-like cavity, the purpose of which is to receive the resin which flows down from the stripped face of the trunk above it. After this cup-like cavity or box is cut in the base of a turpentine-bearing tree the bark and outer layers of wood are hewed off for some distance above the box. This chipping process leaves a central ridge or "peak," which directs the flow of resin so that the same will drop into the box at the base of the tree.
The lighter resin-oil or "dip" which accumulates in the box is collected from time to time, and the heavier gums or "scrape" are removed from time to time from the chipped or blazed part of the tree-trunk. This chipping or hewing off of the bark above the box is repeated from time to time until the bark is removed to the height of several feet or as high as can be conveniently reached. This ordinary practice of gathering turpentine is objectionable, for the reason that the chopping of the cup-like cavity or box in the bottom of the tree weakens the trees, so that they are liable to be blown down, and also injures the vitality of the trees and causes them to be particularly liable to destruction by forest fires. This ordinary system is also comparatively wasteful, as much of the dip, particularly when the trees have been "chipped" for a distance of several feet up the tree-trunks, does not fall into the box or cup-like cavity at the bottom of the tree. To overcome these defects, a considerable number of sap-cups have been devised which are intended to be used as removable attachments for collecting turpentine from pine-trees; but all of such devices, so far as I have been informed, have been either so expensive as to preclude their practical adoption or else have required skilled labor in their application, so that in the turpentine industry it is still the usual practice to chop boxes in the tree-trunks.

In a sap-cup constructed according to this invention I have provided a light integral construction with a particularly simple and efficient manner of application to the trees, so that such cups may be put on and taken off in a simple and direct way, can be applied at any desired heights, and can be used at slight expense to secure an economical gathering of turpentine without injury to the trees.

Referring to the accompanying drawings and in detail, a sap-cup constructed according to this invention, as illustrated most clearly in Fig. 2, is preferably formed from a single piece of sheet metal, which is stamped out by suitable dies to form a substantially crescent-shaped cup portion 10, having the form of an open U-shaped trough in cross-section.

Extending rearwardly and formed with the cup 10 are flanges 11 and 12. These flanges 11 and 12 are arranged at an obtuse angle with respect to each other. Extending down from the sap-cup 10 is a perforated lug 13. In order to fasten a sap-cup as thus constructed in place upon the trunk of a tree, two saw-kerfs C and D are cut at a proper angle to each other to receive the flanges 12 and 11, respectively. These saw-kerfs meet at an angle and prevent the sap-cup from being displaced sidewise. An ordinary nail driven through the hole in the lug 13 will complete the support. One particular advantage in the use of sap-cups as thus constructed is due to the fact that the cups may be readily raised from time to time as the chipping process is carried up the tree-trunks.

The resin-oils are sometimes lighter than water, and it occasionally happens when the sap-cup is filled by rain-water that the cup will overflow and part of the resin-oil will be wasted. To overcome this, I preferably provide the cup near its upper edge with a number of small overflow-holes 14, which will act as strainers, permitting the water to escape, but preventing the resin-oils from wasting.

In order to protect the resin-oil collected in one of my cups from being mixed with chips and refuse which would be liable to fall therein during the process of scraping the tree-trunks, each attendant preferably carries a sheet-metal cover E, corresponding in outline with the substantially crescent-shaped cups, having two obtuse angle lines on the concave side of the crescent. This cover is not intended to be a permanent attachment of the sap-cup, but is only intended as a temporary protection of the contents of the cup while the tree is being scraped or chipped.

In the manufacture of sap-cups in large quantities according to this invention I preferably use sheet-steel, which can be readily worked or shaped by ordinary dies to form the desired cups, and to prevent the sap-cups from rusting I galvanize or tin them in the ordinary way.

I am aware that many changes may be made in the proportions and shapes of sap-cups constructed according to this invention without departing from the scope of my invention as expressed in the claims. I do not wish, therefore, to be limited to the particular form which I have herein shown and described; but What I do claim, and desire to secure by Letters Patent of the United States, is—

1. As an article of manufacture a turpentine-cup comprising a receptacle having an upwardly-extending rear wall, and a flange extending rearwardly from the upper end of said wall and adapted to fit in a pair of angularly-placed saw-kerfs in a tree-trunk, said flange constituting means for preventing the horizontal displacement of the cup along the saw-kerfs.

2. As an article of manufacture, a sap-cup for gathering turpentine consisting of a receptacle having two rearwardly-extending flanges arranged at an obtuse angle with respect to each other and adapted to be placed in saw-kerfs to hold the sap-cup in position on a tree-trunk against horizontal and vertical displacement.

3. As an article of manufacture, a sap-cup for gathering turpentine, comprising a stamped-out sheet of metal, substantially crescent-shaped and of an open substantially U shape in cross-section with two integral rearwardly-extending flanges arranged at an obtuse angle with respect to each other, and adapted to be placed in saw-kerfs to hold the cup in position on a tree-trunk, and with a perforated lug extending down from the receptacle for receiving a nail or other fastening device.

4. The combination of a sap-cup, comprising a pressed sheet-metal substantially crescent-shaped receptacle of an open substantially U-shaped-trough cross-section, having two integral rearwardly-extending flanges arranged at an obtuse angle with respect to each other and with a central downwardly-extending lug perforated to receive a nail or other fastening device, and a substantially crescent-shaped cover for protecting the contents of the receptacle from chips or refuse during the chipping or scraping of the tree-trunk.

5. As an article of manufacture, a turpentine-cup comprising a receptacle having a rearwardly-extending flange adapted to enter saw-kerfs in a tree-trunk and constituting means for preventing the horizontal displacement of the cup, said receptacle having a wall extending downwardly from said flange, said wall being provided with perforations to permit the overflow of water.

6. As an article of manufacture, a cup for collecting the sap of pine and other trees, comprising a receptacle, and a pair of flanges projecting from the upper part of the receptacle at an angle to each other in the same plane and formed integrally with the cup.

In testimony whereof I have hereunto set my hand in the presence of two subscribing witnesses.

HARRY M. WINCHESTER.

Witnesses:
 PHILIP W. SOUTHGATE,
 E. M. ALLEN.